Oct. 10, 1950      H. C. LUTTMAN      2,525,307
DRAIN WICK FOR PRESSURIZED COMPARTMENTS
Filed July 24, 1948
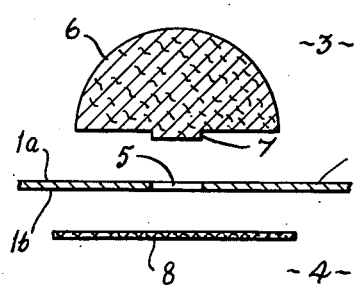
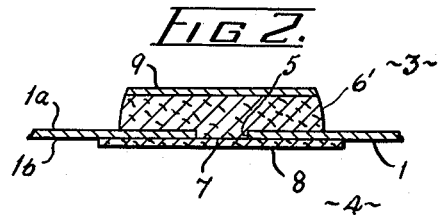
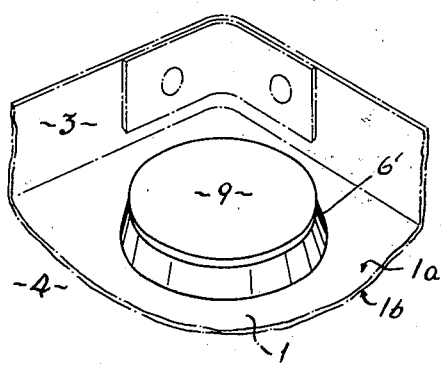
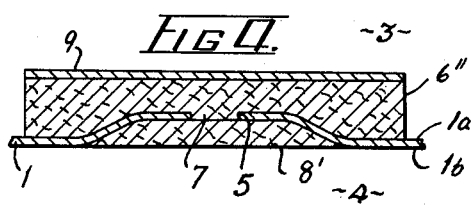
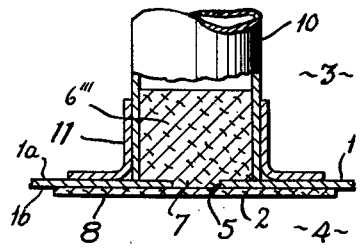
INVENTOR.
H. C. LUTTMAN.
ATTORNEY.

Patented Oct. 10, 1950

2,525,307

UNITED STATES PATENT OFFICE 2,525,307

DRAIN WICK FOR PRESSURIZED COMPARTMENTS

Horace Charles Luttman, Etobicoke Township, York County, Ontario, Canada, assignor to A. V. Roe Canada Limited, Malton, Ontario, Canada, a corporation Application July 24, 1948, Serial No. 40,557

9 Claims. (Cl. 244—117)

This invention relates to improvements in the means of draining moisture, caused by condensation, discharge, spilling and the like, from pressurized compartments of aircraft.

The pressurization of aircraft is adopted in order to maintain low altitude atmospheric conditions in certain parts of the aircraft during high altitude operation, for the comfort and efficiency of the passengers and crew and to avoid damage to baggage and freight; in connection with the latter, it will be appreciated that baggage may contain bottles, fountain pens and similar articles which might leak if subjected to relatively low external pressures such as are encountered at high altitude. Due to temperature variations causing condensation of the moisture in the air, to the entry of rain through doors and hatches inadvertently left open when the aircraft is standing on the ground, and to sundry other circumstances, moisture inevitably collects in an aircraft structure and, in un-pressurized aircraft, it is normal practice to provide small drain holes appropriately located to allow such moisture to escape. It will be understood, however, that in pressurized aircraft where, under operating conditions, the internal pressure may be considerably higher than the external atmospheric pressure, such open drain holes cannot be employed since, unless they are very small (and consequently readily blocked by particles of dirt), the leakage through them would impose an intolerable penalty on the blower system whereby the internal pressure is maintained. To overcome this difficulty drain holes equipped with valves have been adopted in some instances but these valves, though of relatively simple construction, constitute yet an additional complication to the pressurization installation and entail an additional servicing operation in the routine maintenance of the aircraft.

The primary object of this invention is to provide an automatic and constantly applied means of draining those parts of the structure where moisture is liable to collect, which will offer at the same time a substantial resistance to loss of internal air pressure, without being so small that it is liable to become obstructed by an accumulation of dust and the like. Another object is to provide a draining device which is light and simple in construction and relatively cheap to manufacture and install, and which will require no attention during the routine maintenance of the aircraft in service. Other objects and advantages of the invention will be apparent during the course of the following description.

In the accompanying drawings forming a part of this application and in which like numerals are employed to designate like parts throughout the same, Figure 1 is a sectional, exploded view of the invention in the simplest form, Figure 2 is a sectional view of an improved version suitable for normal application to comparatively low-speed aircraft, Figure 3 is a perspective view of the invention shown in Figure 2, seen from the inside of the aircraft, Figure 4 is a sectional view of an adaptation of the invention to suit high-speed air-craft where a smooth external surface is of importance for aerodynamic reasons, and Figure 5 is a sectional view of an application of the invention to the end of a drain-line running from a drip-tray to the outer skin of the aircraft.

In Figure 1 the skin 1 of an aircraft which may be of metal, ply-wood or other suitable material or combination of materials, substantially impervious to the passage of air and moisture, is shown, having an inner surface 1a and an outer surface 1b, and separating the inside 3 of a pressurized compartment of the aircraft from the outer air 4. The skin 1 has a hole 5 in it: the area of the skin 1 which we are considering is situated at a low point of the structure of the compartment where moisture is liable to collect. It will be appreciated that since the compartment is pressurized the air pressure at 3 is substantially higher, under high-altitude operating conditions, than the external pressure at 4, but a violent leakage of air from the inside 3 to the outer air 4, through the hole 5, is prevented by a pad 6 of felt or other suitable wick-like material capable of transmitting moisture by capillary action but resistant to the passage of air. This pad 6 is hemispherical, with a relatively short stem 7 at its centre and, in assembly, it is attached by adhesive to the inner surface 1a of the skin 1 in such a way that the stem 7 is inserted in the hole 5. The stem 7 is cylindrical of a radius equal to the radius of the hole 5 and it is of sufficient length to bring it flush with, or slightly proud of, the outer surface 1b: that is to say, the length of the said stem 7 is equal to, or slightly greater than, the gauge of the skin 1. Externally a circular pad 8 of felt or some similar material is attached by adhesive to the outer surface 1b in such a way that it makes contact with the stem 7 of the inner pad 6. Said stem 7 forms a plug which extends through the hole 5 in the skin and serves to connect the pad 6 with the pad 8; it may be integral with pad 6 as shown, or integral with pad 8 or it may be a separate piece of material similar to the material of which the pads are made.

Care is taken during assembly to ensure that the adhesive is spread evenly and completely between the contacting surfaces of the pad 6 and the inner surface 1a, and of the pad 8 and the outer surface 1b, both for adhesive purposes and as a protection against corrosion, but that the contact faces of the stem 7 and the pad 8 are not fouled by adhesive or other substance likely to impair the capillary transfer between them.

When assembled the details shown in Figure 1 appear similar to the assembly shown in Figures 2 and 3 except that in Figures 2 and 3 the upper portion of the hemispherical pad has been removed (reducing the pad, in effect, to a cylindrical or truncated pad 6') and replaced by a thin sheet 9 of metal or other material impervious to the passage of air. This sheet 9 is attached to the pad 6' by adhesive.

The radius of the hemispherical pad 6 as shown in Figure 1, and of the truncated pad 6' as shown in Figure 2, and the density of the felt or other material of which the said pads are made, are so chosen that the leakage of air through the assembly, in a dry condition, for a given area of the hole 5 and under the specified maximum pressure difference between the air at 3 and the outside air 4 is within the limits permitted by the pressurization system; taking into account the capacity of the blowers, the number of drain outlets required by the configuration of the structure and like considerations. That is to say, by simple experiment the device may be constructed so that while it will carry off such moisture as will accumulate it will not, even when dry, permit the passage of air to a greater extent than the pressurization system can accommodate. It has been found that felt of S. A. E. specification F—1 is a suitable material for the absorption pads 6 and 6' described above and also the absorption pads 6'' and 6''' hereafter described, as well as for the stem or plug 7, in a typical pressure chamber having a differential pressure of 9 pounds per square inch with an absorption pad of about 2½'' diameter over a ¼'' diameter hole; this permits a leakage through the hole of not more than one cubic foot of air per minute. In this connection, resistance to the passage of air may not be augmented by any treatment of the felt which will impair its capillary properties, since its function is to absorb any moisture which may collect on the inner surface 1a of the skin 1 in the neighbourhood of the pad and to conduct it by capillary action to and through the stem 7, where it is transferred, again by capillary action, to the external pad 8. The said external pad 8 being constantly exposed to the outer atmosphere provides a means whereby such moisture as it may absorb from the stem 7 is evaporated and carried away. In brief, the assembly acts as a wick which carries moisture from inside the aircraft to evaporation in the outer atmosphere, without undue loss of air from the pressurized compartment.

Since, under conditions of cold weather, the aircraft will normally be at a higher temperature than its surroundings, it is desirable that the evaporation pad 8 should be of a light colour, so that it will not readily radiate heat and so aggravate the risk of its becoming frozen.

In the arrangement shown in Fig. 4 the skin 1 has been dished locally to accommodate the thickness of the evaporation pad 8' and so present a smooth external surface. In such circumstances the diameter and configuration of the inner absorption pad 6'' must be such that the pad 6'' overhangs the dishing, to reach the undished part of the inner surface 1a of the skin 1, where moisture may collect. Similarly the pad 8' is shaped to conform to the external configuration of the dished portion of the skin 1 so as to engage the outer surface 1b with its outer surface substantially flush with the general contour of the outer surfaces of the skin.

In Figure 5 the absorption pad 6''' takes the form of a cylindrical plug in the end of the drain-line 10 which is secured at its end to the skin 1 by flange 11. As in the aforementioned arrangements shown in Figures 1 to 4 the diameter of the pads 6, 6' and 6'' is a factor in their resistance to leakage of air pressure, in the arrangement shown in Fig. 5 the axial length of the plug 6''' is a like factor.

It is to be understood that the forms of the invention, herein shown and described, are to be taken as preferred examples of the same, and that various changes in the shape, size and arrangement of the parts may be resorted to, without departing from the spirit of the invention or the scope of the claims.

What I claim as my invention is:

1. In a compartment of an aircraft contained in a skin substantially impervious to the passage of air and moisture and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, and a plug of similar material to that of the pads and of approximately the same dimensions as the hole, inserted in the hole and making contact with both the inner and the outer pads.

2. In a compartment of an aircraft, contained in a skin substantially impervious to the passage of air and moisture and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, and one of the said pads being provided with a protuberance, the said protuberance passing through the hole and making contact with the other pad.

3. In a compartment of an aircraft, contained in a skin substantially impervious to the passage of air and moisture, and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, and a plug, of similar material to that of the pads and of approximately the same dimensions as the hole, inserted in the hole and making contact with both the inner and the outer pads, the outer pad being relatively thin and of a light colour to prevent loss of heat by radiation.

4. In a compartment of an aircraft, contained in a skin substantially impervious to the passage of air and moisture, and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, a plug, of similar material to that of the pads and of approximately the same dimensions as the hole, inserted in the hole and making contact with both the inner and the outer pads, and a partial covering of material substantially impervious to the passage of air overlying the inner pad so that the surface area of said pad which is exposed to positive air pressure is thereby reduced.

5. In a compartment of an aircraft, contained in a skin substantially impervious to the passage of air and moisture, and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, a plug, of similar material to that of the pads and of approximately the same dimensions as the hole, inserted in the hole and making contact with both the inner and the outer pads, the skin around said hole being inwardly dished and the outer pad substantially conforming to the dished portion of the skin with its outer surface substantially flush with the general contour of the outer surface of the skin.

6. In a compartment of an aircraft, contained in a skin substantially impervious to the passage of air and moisture, and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, a plug, of similar material to that of the pads and of approximately the same dimensions as the hole, inserted in the hole and making contact with both the inner and the outer pads, the skin around said hole being inwardly dished and the inner pad extending over the dished portion to the undished parts of the skin where moisture may collect.

7. In a compartment of an aircraft, contained in a skin substantially impervious to the passage of air and moisture, and in which the internal air pressure may be raised to a degree sensibly higher than the external air pressure, the said skin having a hole therein situated at a point where moisture is likely to accumulate within the compartment, the provision at the said hole of a pair of pads of wick-like material capable of transmitting moisture by capillary action but resistant to the passage of air, one of the said pads being attached internally and the other externally to the skin of the compartment, the inner pad completely covering the said hole, a plug, of similar material to that of the pads and of approximately the same dimensions as the hole, inserted in the hole and making contact with both the inner and the outer pads, and a drain pipe terminating at the inner surface of the skin and surrounding the inner pad.

8. In a compartment of an aircraft, contained in a skin substantially impervious to the passage of air, and in which the internal air pressure may be raised to a degree sensibly higher than the external air pressure, the said skin having a hole therein situated at a point where moisture is likely to accumulate within the compartment, the provision of means for conducting any such moisture through the said hole by capillary action, such means being resistant to the passage of air, and means for dispersing such moisture outside the compartment.

9. In an aircraft, a pressurized compartment having a drain hole provided at a point where moisture is likely to accumulate inside the compartment, a pad of felt attached internally to the skin of the compartment so that it covers the said drain hole, said pad being of such dimensions that it offers appreciable resistance to the flow of air through the drain hole, said pad serving to absorb any moisture accumulating in the compartment, a further felt pad attached externally to the skin of the compartment, said pad having contact at the hole with the aforementioned internally-mounted pad so that moisture is conducted by wick action through the drain hole and subjected to evaporation in the outer atmosphere.

HORACE CHARLES LUTTMAN.

REFERENCES CITED

The following references are of record in the file of this patent:

UNITED STATES PATENTS

| Number | Name | Date |
|---|---|---|
| 2,223,586 | Thomas | Dec. 3, 1940 |
| 2,336,456 | Anderegg | Dec. 14, 1943 |